United States Patent
van der Wagt et al.

(10) Patent No.: US 12,041,713 B2
(45) Date of Patent: Jul. 16, 2024

(54) REDUCING TIMING SKEW IN A CIRCUIT PATH

(71) Applicant: Teradyne, Inc., North Reading, MA (US)

(72) Inventors: Jan Paul Antonie van der Wagt, Carlsbad, CA (US); Bradley A. Phillips, Westlake Village, CA (US)

(73) Assignee: TERADYNE, INC., North Reading, MA (US)

( * ) Notice: Subject to any disclaimer, the term of this patent is extended or adjusted under 35 U.S.C. 154(b) by 0 days.

(21) Appl. No.: 15/683,901

(22) Filed: Aug. 23, 2017

(65) Prior Publication Data

US 2019/0069394 A1 Feb. 28, 2019

(51) Int. Cl.
| | |
|---|---|
| *H05K 1/02* | (2006.01) |
| *G06F 1/10* | (2006.01) |
| *G06F 30/30* | (2020.01) |
| *G06F 30/3312* | (2020.01) |
| *G06F 119/12* | (2020.01) |
| *H03K 19/003* | (2006.01) |

(52) U.S. Cl.
CPC ............ *H05K 1/0248* (2013.01); *G06F 1/10* (2013.01); *G06F 30/30* (2020.01); *G06F 30/3312* (2020.01); *H03K 19/00323* (2013.01); *H05K 1/0298* (2013.01); *G06F 2119/12* (2020.01)

(58) Field of Classification Search
CPC ...... H05K 1/0248; H05K 1/0298; G06F 1/10; G06F 17/5031; G06F 17/5045
See application file for complete search history.

(56) References Cited

U.S. PATENT DOCUMENTS

| | | | |
|---|---|---|---|
| 4,463,273 | A | 7/1984 | Dingwall |
| 5,298,799 | A | 3/1994 | Cochran et al. |
| 5,646,884 | A | 7/1997 | van der Wagt |
| 5,699,003 | A | 12/1997 | Saeki |
| 5,883,829 | A | 3/1999 | van der Wagt |
| 5,953,249 | A | 9/1999 | van der Wagt |
| 6,075,395 | A | 6/2000 | Saeki |
| 6,114,890 | A | 9/2000 | Okajima et al. |
| 6,150,242 | A | 11/2000 | Van der Wagt et al. |
| 6,218,874 | B1 | 4/2001 | Lerner et al. |

(Continued)

FOREIGN PATENT DOCUMENTS

| | | |
|---|---|---|
| CN | 101884192 A | 11/2010 |
| CN | 104785706 A | 7/2015 |

(Continued)

OTHER PUBLICATIONS

International Search Report for PCT/US2018/046647, 4 pages (mailed Nov. 19, 2018).

(Continued)

*Primary Examiner* — Ryan Johnson
*Assistant Examiner* — Colleen J O Toole
(74) *Attorney, Agent, or Firm* — Burns & Levinson LLP (57) ABSTRACT

An example method performed for a circuit path includes: receiving signals in the circuit path; and controlling states of the signals in the circuit path based on skews produced by circuits electrically connected in series in the circuit path. The states are controlled by inverting or not inverting the signals in the circuit path so that skews produced by different circuits in the circuit paths at least partially cancel.

20 Claims, 3 Drawing Sheets

(56) References Cited

U.S. PATENT DOCUMENTS

| | | |
|---|---|---|
| 6,252,430 B1 | 6/2001 | van der Wagt et al. |
| 6,252,441 B1 | 6/2001 | Lee et al. |
| 6,291,981 B1 | 9/2001 | Sartschev |
| 6,380,779 B1 | 4/2002 | Lachman et al. |
| 6,456,214 B1 | 9/2002 | van der Wagt |
| 6,490,193 B1 | 12/2002 | van der Wagt et al. |
| 6,509,859 B1 | 1/2003 | van der Wagt |
| 6,667,490 B2 | 12/2003 | Van der Wagt et al. |
| 6,687,868 B1 | 2/2004 | Furukawa et al. |
| 6,703,907 B1 | 3/2004 | van der Wagt |
| 6,771,061 B2 | 8/2004 | Sartschev et al. |
| 6,859,075 B1 | 2/2005 | Van der Wagt |
| 6,874,097 B1 | 3/2005 | Aliahmad et al. |
| 7,187,742 B1 | 3/2007 | Logue et al. |
| 7,287,143 B2 | 10/2007 | Lee et al. |
| 7,557,643 B2 | 7/2009 | Jin et al. |
| 7,593,497 B2 | 9/2009 | Conner |
| 7,728,650 B2 | 6/2010 | van der Wagt |
| 7,868,681 B2 | 1/2011 | van der Wagt |
| 8,094,766 B2 | 1/2012 | Conner |
| 8,410,824 B2 | 4/2013 | Mehdizad Taleie et al. |
| 8,516,425 B2 * | 8/2013 | Nikitin ................. G06F 17/505 257/508 |
| 8,565,034 B1 | 10/2013 | Lu et al. |
| 8,692,538 B2 | 4/2014 | Phillips |
| 8,705,592 B2 | 4/2014 | Oh et al. |
| 9,147,620 B2 | 9/2015 | van der Wagt et al. |
| 9,279,857 B2 | 3/2016 | Lin et al. |
| 9,397,670 B2 | 7/2016 | van der Wagt et al. |
| 9,425,747 B2 | 8/2016 | Bazarjani et al. |
| 9,503,065 B1 | 11/2016 | van der Wagt et al. |
| 9,772,378 B2 | 9/2017 | Lyons |
| 2001/0014131 A1 | 8/2001 | Mashimo et al. |
| 2002/0101945 A1 | 8/2002 | Audy et al. |
| 2003/0088836 A1* | 5/2003 | Kanazawa ....... G01R 31/31721 716/136 |
| 2003/0140318 A1 | 7/2003 | Kitahara et al. |
| 2003/0234670 A1 | 12/2003 | Curran |
| 2004/0068682 A1 | 4/2004 | Takei et al. |
| 2004/0223566 A1 | 11/2004 | Yamashita |
| 2005/0024120 A1 | 2/2005 | Chang et al. |
| 2005/0104618 A1 | 5/2005 | Han |
| 2005/0193356 A1 | 9/2005 | Kuekes et al. |
| 2006/0111861 A1 | 5/2006 | Horne et al. |
| 2006/0250169 A1 | 11/2006 | Sareen et al. |
| 2006/0256880 A1 | 11/2006 | Frisch |
| 2006/0256908 A1 | 11/2006 | Ludwig |
| 2007/0126410 A1 | 6/2007 | Figoli |
| 2007/0205818 A1 | 9/2007 | Fiedler |
| 2008/0018371 A1 | 1/2008 | Suda et al. |
| 2008/0048905 A1 | 2/2008 | McEwan |
| 2008/0056029 A1 | 3/2008 | Cheng |
| 2008/0234961 A1 | 9/2008 | Tanaka |
| 2008/0307277 A1 | 12/2008 | Tschanz et al. |
| 2008/0309400 A1 | 12/2008 | van der Wagt |
| 2009/0220110 A1 | 9/2009 | Bazarjani et al. |
| 2009/0249141 A1 | 10/2009 | Yasuda |
| 2010/0295581 A1 | 11/2010 | Mehdizad Taleie et al. |
| 2010/0299644 A1 | 11/2010 | Kawai |
| 2011/0309865 A1 | 12/2011 | Cordos |
| 2012/0313618 A1 | 12/2012 | Phillips |
| 2012/0326738 A1 | 12/2012 | Kim et al. |
| 2012/0326760 A1 | 12/2012 | Kesselring et al. |
| 2013/0009686 A1 | 1/2013 | Bucher et al. |
| 2013/0027102 A1 | 1/2013 | Chen et al. |
| 2013/0117598 A1 | 5/2013 | Lee |
| 2013/0260485 A1 | 10/2013 | van der Wagt et al. |
| 2015/0137838 A1 | 5/2015 | Lin et al. |
| 2015/0324514 A1* | 11/2015 | Teig .................... G06F 17/505 716/134 |
| 2016/0006441 A1 | 1/2016 | van der Wagt et al. |
| 2016/0065183 A1 | 3/2016 | Antonie van der Wagt |
| 2016/0112223 A1 | 4/2016 | Kitsukawa et al. |
| 2016/0164509 A1 | 6/2016 | Ma |
| 2016/0173090 A1 | 6/2016 | Meinerzhagen et al. |
| 2017/0278289 A1 | 9/2017 | Marino et al. |

FOREIGN PATENT DOCUMENTS

| | | |
|---|---|---|
| CN | 101346927 A | 1/2019 |
| EP | 0896432 A1 | 2/1999 |
| JP | H07-72221 A | 3/1995 |
| JP | H11-73238 | 3/1999 |
| JP | 2000-183701 A | 6/2000 |
| JP | H11-732383 A | 8/2000 |
| JP | 2001-084287 A | 3/2001 |
| JP | 2010-054396 A | 3/2010 |
| JP | 2010-085178 A | 4/2010 |
| JP | 2014-116981 A | 9/2015 |
| KR | 10-1502759 B1 | 3/2015 |
| KR | 2017-0048335 | 5/2017 |
| WO | WO-01/33240 A2 | 5/2001 |
| WO | WO-2008/118841 A1 | 10/2008 |
| WO | WO-2017/039852 A1 | 3/2017 |

OTHER PUBLICATIONS

Written Opinion for PCT/US2018/046647, 9 pages (mailed Nov. 19, 2018).
File History for U.S. Appl. No. 14/840,498, 187 pages (Retrieved Jan. 18, 2019).
File History for U.S. Appl. No. 15/683,906, 326 pages (Retrieved Jan. 22, 2019).
International Preliminary Report on Patentability for PCT/US2016/042742, 9 pages (Mar. 6, 2018).
International Search Report for PCT/US2018/046711, 3 pages (mailed Dec. 4, 2018).
Written Opinion for PCT/US2016/042742, 8 pages (Oct. 12, 2016).
Written Opinion for PCT/US2018/046711, 8 pages (mailed Dec. 4, 2018).
File History for U.S. Appl. No. 15/683,906, 149 pages (retrieved Oct. 23, 2018).
International Preliminary Report on Patentability for PCT/US2015/046082, 7 pages (mailed Feb. 28, 2017).
International Search Report for PCT/US2013/029121, 3 pages (mailed Jun. 3, 2013).
International Search Report for PCT/US2015/046082, 3 pages (mailed Nov. 27, 2015).
Written Opinion for PCT/US2013/029121, 8 pages (mailed Jun. 3, 2013).
Written Opinion for PCT/US2015/046082, 6 pages (mailed Nov. 27, 2015).
International Search Report for PCT/US2016/042742, 3 pages (Oct. 12, 2016).
International Preliminary Report on Patentability, Application No. PCT/US2018/046647, 10 pages, (Feb. 25, 2020).
International Search Report for PCT Application No. PCT/US2016/042742, 3 pages, (Oct. 12, 2016).
First Office Action for Chinese Patent Application No. 201880053280.9, mailed Dec. 22, 2021, (12 pages).
Final Notice of Reasons for Rejection for Japanese Patent Application No. 2020-505191, mailed Jan. 10, 2023, with English Summary, (7 pages).
Notice of Reasons for Rejection for Japanese Patent Application No. JP2020-505191, mailed Sep. 27, 2022, (with English translation), (9 pages).
Office Action in KR Application No. 10-2020-7008104 dated Jun. 7, 2023 (with English translation), 8 pages.
File History for U.S. Appl. No. 15/683,906, 43 pages (Retrieved Aug. 24, 2017).

* cited by examiner

REDUCING TIMING SKEW IN A CIRCUIT PATH

TECHNICAL FIELD

This specification relates generally to reducing timing skew in a circuit path.

BACKGROUND

In some contexts, skew refers to the difference between an expected timing of a signal and an actual timing of the signal. Rising edge skew is the distortion of a signal pulse resulting from a delay in the rising edge of the signal; falling edge skew is the distortion of a signal pulse resulting from delay in the falling edge of the signal; and rise/fall skew (RFS) is the distortion of a signal pulse resulting from delays in both the rising edge of the signal and the falling edge of the signal.

SUMMARY

An example method performed for a circuit path comprises: receiving signals in the circuit path; and controlling states of the signals in the circuit path based on skews produced by circuits electrically connected in series in the circuit path. The states are controlled by inverting or not inverting the signals in the circuit path so that skews produced by different circuits in the circuit paths at least partially cancel. The example method may include one or more of the following, either alone or in combination.

The circuits in the circuit path may comprise N (N≥2) circuits electrically connected in series in the circuit path, with each of the N circuits to skew an $N^{th}$ signal in the first direction or the second direction based on a state of the $N^{th}$ signal. Controlling the states of the signals may comprise controlling, for one or more of the N circuits, a state of the $N^{th}$ signal. One or more of the N circuits may have an adjustable delay. Controlling the states of the signals may comprise controlling the one or more of the N circuits based on a setting of the adjustable delay.

The circuit path may comprise: a first circuit to skew a first signal in a first direction or a second direction based on a state of the first signal; and a second circuit to skew a second signal in the first direction or the second direction based on a state of the second signal, with the first circuit and the second circuit being electrically connected in series in the circuit path. Controlling the states may comprise: causing the first circuit to skew the first signal in the first direction and causing the second circuit to skew the second signal in the second direction; or causing the first circuit to skew the first signal in the second direction and causing the second circuit to skew the second signal in the first direction. The first signal and the second signal may comprise components of a signal passing through the circuit path. Skewing the first signal in the first direction and the second signal in the second direction may reduce skew in the signal passing through the circuit path; or skewing the first signal in the second direction and the second signal in the first direction may reduce skew in the signal passing through the circuit path.

The circuit path may comprise control circuitry to control skew in the circuit path by controlling one or more of: the state of the first signal, the state of the second signal, and a state following an output of the second circuit. The example method may comprise controlling one or more inputs to the control circuitry in order to perform one of: causing the first circuit to skew the first signal in the first direction and causing the second circuit to skew the second signal in the second direction; or causing the first circuit to skew the first signal in the second direction and causing the second circuit to skew the second signal in the first direction.

Inverting or not inverting the signals in the circuit path may be performed using one or more multiplexers combined with corresponding inverter circuitry. Inverting or not inverting the signals in the circuit path may be performed by switching wire paths of differential signals used in the circuit path.

The example method may comprise storing information about skew produced by the circuits, with the information relating to skew amounts provided in each of the circuits; and using the information to control the states of signals in the circuit. The circuit path may be part of automatic test equipment, with the circuit path being between pin electronics of the automatic test equipment and a device interface board to which a device under test connects. The states may be controlled to move rising and falling signal edge skews independently.

An example circuit path comprises a first circuit to skew a first signal in a first direction or a second direction based on a state of the first signal; a second circuit to skew a second signal in the first direction or the second direction based on a state of the second signal, with the first circuit and the second circuit being electrically connected in series in the circuit path; and control circuitry to control skew in the circuit path by controlling one or more of: the state of the first signal, the state of the second signal, and a state following an output of the second circuit. The example circuit path may include one or more of the following, either alone or in combination.

The first and second circuits may be among N (N≥2) circuits in series in the circuit path, with each of the N circuits to skew an $N^{th}$ signal in the first direction or the second direction based on a state of the $N^{th}$ signal. The control circuitry may be configured to control skew in the circuit path by controlling, for two or more of the N circuits, a state of the $N^{th}$ signal. Control of the skew in the circuit path may comprise reducing an amount of the skew in the circuit path to a non-zero value. The example circuit path may comprise additional circuitry to reduce the amount of the skew from the non-zero value. The example circuit path may be configured to select among the N circuits, and to control states of signals corresponding to selected ones of the N circuits.

The example circuit path may comprise a first controllable inverter that precedes, and is electrically connected in the circuit path to, the first circuit, with the first controllable inverter to produce the state of the first signal; a second controllable inverter that is between, and electrically connected in the circuit path to both of, the first circuit and the second circuit, with the second controllable inverter to produce the state of the second signal; and a third controllable inverter that follows, and is electrically connected in the circuit path to, the second circuit, with the third controllable inverter to produce the state following the output of the second circuit. The first controllable inverter may be controllable either to invert the first signal or not to invert the first signal, with the state of the first signal being inverted or not inverted. The second controllable inverter may be controllable either to invert the second signal or not to invert the second signal, with the state of the second signal being inverted or not inverted. The third controllable inverter may be controllable either to invert the output of the second circuit or not to invert the output, with the state of the output being inverted or not inverted. The first controllable inverter may comprise a multiplexer combined with an inverter; the second controllable inverter may comprise a multiplexer combined with an inverter; and the third controllable inverter may comprise a multiplexer combined with an inverter.

The control circuitry may be configured to control two, but not all, of: the state of the first signal, the state of the second signal, and the state following the output of the second circuit. Total skew produced in the circuit path may include a sum of first skew produced by the first circuit and second skew produced by the second circuit. The control circuitry may be configured to control one or more of the state of the first signal, the state of the second signal, and the state following the output of the second circuit in order to negate skew in the circuit path caused by the first circuit and the second circuit.

The example circuit pay may include memory storing first information about skew produced by the first circuit in both the first direction and the second direction, and second information about skew produced by the first circuit in both the first direction and the second direction. At least one of the first information or the second information is used to set at least one of the state of the first signal, the state of the second signal, or the state following the output of the second circuit.

The example circuit pay may include a first element that precedes the first circuit, a second element between the first circuit and the second circuit, and a third element that follows the second circuit. At least one of the first element or the second element is configured to invert signals in the circuit path, and at least one of the second element or the third element is configured to invert signals in the circuit path.

The example circuit pay may include an adjustable delay line. The control circuitry may be configured to control skew in the circuit path based also on stored information about delay associated with the adjustable delay line.

The control circuitry may be configured to control skew in the circuit path by inverting or not inverting the first signal so as to negate, as least partly, skew caused by the first circuit. The control circuitry may be configured to control skew in the circuit path by inverting or not inverting the second signal so as to negate, as least partly, skew caused by the second circuit.

The example circuit path comprises circuitry to produce a finer reduction in skew than through control over one or more of: the state of the first signal, the state of the second signal, and a state following an output of the second circuit.

The state controlled by the example method and in the example circuit path may be signal polarity.

Example automatic test equipment (ATE) includes a first circuit to skew a first signal in a first direction or a second direction based on a state of the first signal; a second circuit to skew a second signal in the first direction or the second direction based on a state of the second signal, with the first circuit and the second circuit being electrically connected in series in a circuit path; and control circuitry to control skew in the circuit path by controlling one or more of: the state of the first signal, the state of the second signal, and a state following an output of the second circuit. The example ATE also includes a device interface board to which a device under test is connected, with the circuit path for passing signals to, and from, the device interface board.

Any two or more of the features described in this specification, including in this summary section, can be combined to form implementations not specifically described herein.

The systems and techniques and processes described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques and processes described herein, or portions thereof, can be implemented as an apparatus, method, or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Described herein are example techniques for reducing skew in a circuit path containing circuits electrically connected in series. The example techniques include controlling states of signals in the circuit path based on skews produced by the circuits. An example of a "state" in this context is a signal's polarity. The states may be controlled by inverting or not inverting the signals in the circuit path so that skews produced by different circuits in the circuit paths at least partially cancel. For example, the circuit path may include a first circuit to skew a first signal in a first direction or a second direction based on a state of the first signal; a second circuit to skew a second signal in the first direction or the second direction based on a state of the second signal; and control circuitry to control skew in the circuit path by controlling one or more of: the state of the first signal, the state of the second signal, and a state following an output of the second circuit. For example, the states may be controlled so that negative and positive skews produced by circuits in the circuit path at least partially cancel (e.g., cancel less than completely in some cases or cancel completely in some cases), thereby reducing the overall skew (e.g., the absolute value of the skew) of the circuit path. The first and second circuits may be among N (N≥2) circuits in series in the circuit path, with each of the N circuits to skew an $N^{th}$ signal in the first direction or the second direction based on a state of the $N^{th}$ signal. The control circuitry may be configured to control skew in the circuit path by controlling, for two or more of the N circuits, a state of the $N^{th}$ signal, as described herein to reduce skew.

In some implementations, the circuit path is part of automatic test equipment (ATE). For example, the circuit path may be between pin electronics of the ATE and a device interface board (DIB) to which a device under test connects (DUT). However, the techniques and processes described herein are not limited to a circuit path of this type, and are not limited to a testing context. Rather, the techniques and processes may be used in any appropriate context to control skew.

In this regard, in an example circuit path, a signal travels through a series of circuits. Examples of those circuits include buffer stages; however, any appropriate circuit may be used. Signal degradations that occur for such series circuits include duty cycle distortion, such as rise/fall skew (RFS, caused by the rising and falling edges of the input signal having different path delays. Although average RFS can be addressed to some extent, on an example integrated circuit every circuit path exhibits its own RFS due to on-die mismatch from processing variations. This is a statistical quantity across multiple circuit paths, with implications for yield against actual performance that each circuit path must meet. Since it is desirable to stay above a minimum pulse width (for both positive and negative pulses) in a circuit path, RFS may decrease design margins. For example, if the pulse width of a signal goes below the minimum width, the pulse may no longer be detectable in the circuit path, in the DUT, or in the ATE.

Figure 1:
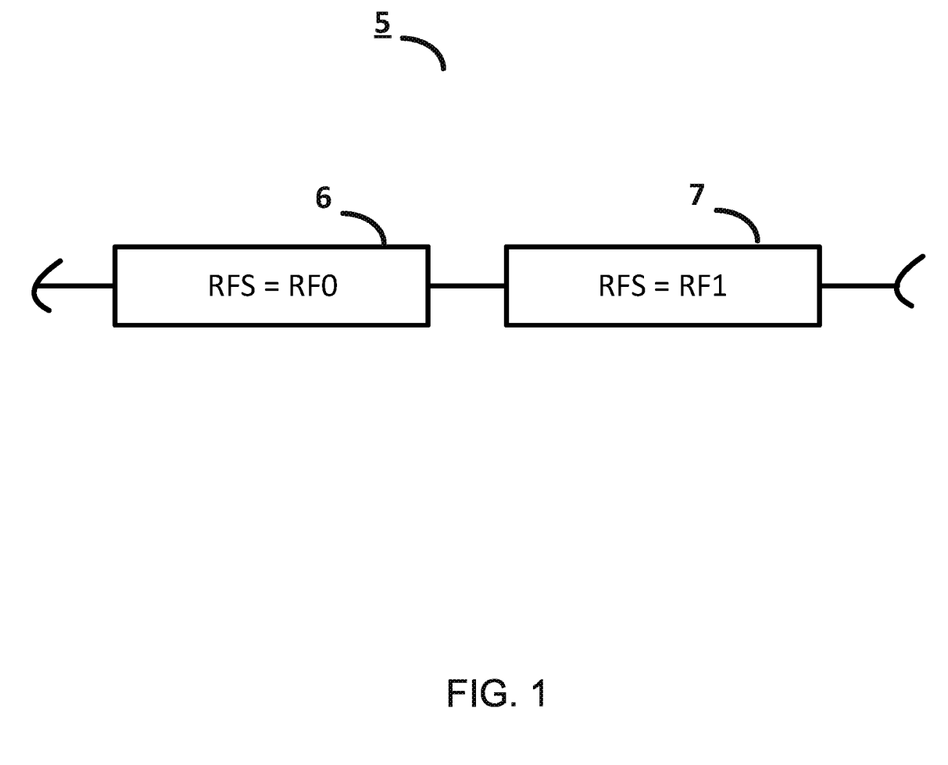
FIG. 1 is a block diagram of an example circuit path—in this case, a delay line—that does not include polarity switches.

FIG. 1 shows an example circuit path 5—in this case, a delay line—that is represented conceptually as two circuits, "0" 6 and "1" 7. Although only two circuits are shown in FIG. 1, circuit path 5 may include additional circuits (not shown) connected in to the input of circuit 6 and/or to the output of circuit 7. In this regard, the techniques and processes described herein may be implemented using any appropriate number of circuits. The circuits may include any appropriate circuitry, e.g., from a simple transmission line, to a buffer, to more complicated logic circuitry.

Circuit 6 has an RFS of RF0 and circuit 7 has an RFS of RF1. In this regard, RFS is an additive quantity; that is, the overall RFS of the patch containing circuits 6 and 7 is RF0 plus RF1. In other words, rising edge delays and falling edge delays are cumulative for circuits that are arranged in series, such as those shown in FIG. 1.

Figure 2:
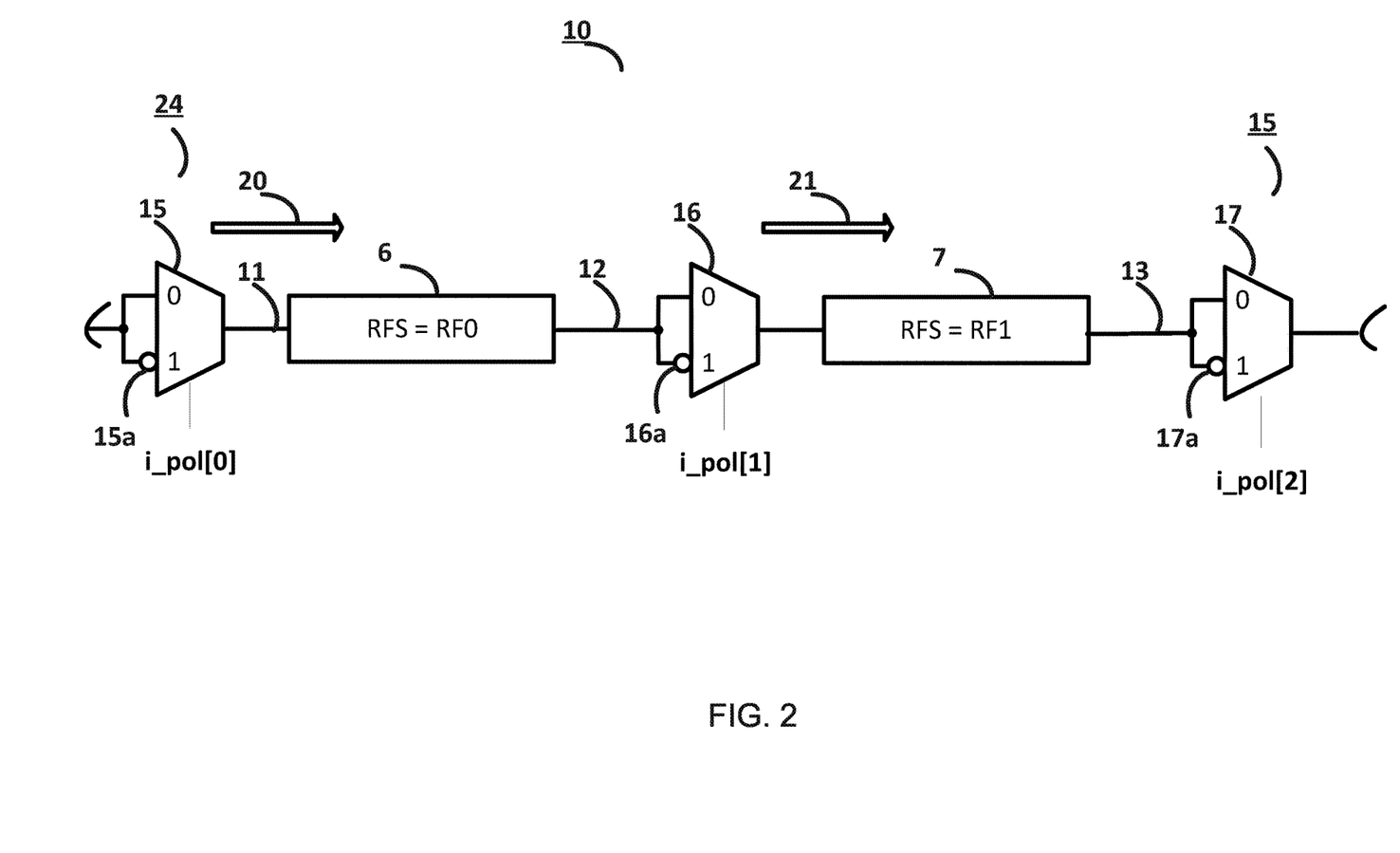
FIG. 2 is a block diagram of an example circuit path—in this case, a delay line—that includes polarity switches for controlling RFS delay.

FIG. 2 shows an example circuit path 10 of the type shown in FIG. 1, which also includes three controllable signal inverters: one at an input 11 of the circuit path, one at a middle 12 of the circuit path, and one at an end 13 of the circuit path. In the example of FIG. 2, each controllable signal inverter includes a multiplexer 15 (i_pol[0]), 16 (i_pol[1]), and 17 (i_pol[2]), and an inversion circuit that is at an input to each multiplexer. Each inversion circuit may be implemented using any appropriate inversion technology. The inversion circuits are labeled 15a, 16a, and 17a, to reflect their association with corresponding multiplexers labeled 15, 16, and 17, respectively. Each multiplexer is controlled to select either an original input signal or its inverted version for output along circuit path 10. In some implementations, there may be different numbers of circuits and different numbers of inverters than those shown in FIG. 2.

In the example of FIG. 2, if a signal at an input of a circuit, e.g., at the input of circuit 7, is inverted, and that signal is again inverted at the output of that circuit, then circuit path 10 produces no net inversion of the signal. However, as a result of this inversion, the RFS contribution of circuit 7 to the circuit path changes sign. That is, instead of contributing RF1, circuit 7 contributes -RF1. This is because the RFS produced by rising and falling edges have different polarities and, oftentimes, different absolute values. In this example, therefore, the overall RFS of the circuit path is equal to RF0 minus RF1 (that is RF0 plus -RF1). Accordingly, as a result of the cumulative effect of RF0 and RF1, the overall skew on the circuit path is reduced. For example, RF1 may at least partially cancel RF0 and, in some cases, RF1 may overcompensate for RF0. In either case, the absolute overall skew is reduced.

Described herein are techniques and processes to configure inversion settings on a circuit path to reduce the overall (e.g., absolute) RFS of the circuit path. For instance, in the example of FIG. 2, multiplexer 15 may be operated to cause circuit 6 to skew a first signal 20 in one direction (e.g., through non-inversion of signal 20) and multiplexer 16 may be operated to cause circuit 7 to skew a second signal 21 (which is a propagated version of signal 20 in this example) in the opposite direction that the first signal is skewed (e.g., through inversion of signal 21). For example, the first signal may have a positive RFS and the second signal may have a negative RFS. Because RFS is cumulative in a series circuit, the resulting RFS in the first and second signals cancel, at least partially, thereby reducing the overall RFS in circuit path 10.

The multiplexers may be controlled independently. For example, there need not be coordination among the operation of the multiplexers. As a result, the techniques and processes described herein may be used not only to cancel-out skew, but also to control skew in a circuit path. For example, the techniques may be used to add positive or negative RFS to a circuit path, e.g., in order to control signal pulse widths to achieve a desired objective. In some implementations, a computing system (e.g., a test computer), one or more microprocessors, one or more controllers, or programmable logic may control operation of the multiplexers.

In the above example, RFS contribution of the inverters is not taken into account. As described above, in the example implementation of FIG. 2, each controllable signal inverter—also referred to herein as a polarity switch or polarity switch circuit—may include a 2:1 multiplexer. In this example, the 2:1 multiplexer includes two inputs that receive a signal and its inverse, respectively. Each multiplexer 15, 16, and 17 may be controlled to provide appropriate signal inversions to reduce overall skew in circuit path 10. In some cases, however, there may be an RFS difference between two polarity switch (e.g., multiplexer) inputs. That is, the RFS produced by passing through the non-inverted input may be different from the RFS produced by passing through the inverted input.

In single-ended circuit paths, the RFS difference between the two inputs of the polarity switch may be addressed as follows. In some implementations, as long as the circuits between polarity switches include a relatively large number stages—e.g., on the order of ten stages or more—unknown RFS introduced by the polarity switches will be small relative to the overall circuit path RFS that is being reduced. Accordingly, due to its size relative to the overall circuit path RFS, the RFS introduced by the polarity switches may have little, or at least a negligible, effect on the overall RFS.

In circuit paths that employ differential circuits, an inversion operation need not be employed. In implementations of this type, the inversion (at each multiplexer "1" input) can be implemented simply by flipping the role of the positive and negative polarity wires. Accordingly, in some implementations, inverting or not inverting the signals in the circuit path is performed by switching wire paths of differential signals used in the circuit path. Note that in the differential case, signal lines in FIG. 2, for example, represent two actual wires, one for the positive voltage and one for the negative voltage of the signal (the signal is then, by definition, the difference of these two voltages). This may not introduce delay errors and, therefore, additional RFS. In the differential case, there still may be multiplexer internal path differences between different internal paths. In some implementations, this contribution may not be zero, but will may be limited relative to each circuit's RFS (RF0 and RF1 in FIG. 2). Accordingly, due to its size relative to the overall circuit path RFS, the RFS introduced as a result of the multiplexer internal path differences may have little, or at least a negligible, effect on the overall RFS.

FIG. 2 shows more switches than may be needed to perform inversions to reduce RFS in a circuit path. More specifically, referring to Table 1 below, three controllable multiplexers (i_pol[0]) 15, (i_pol[1]) 16, and (i_pol[2]) 17 produce eight states total, only four of which are shown in Table 1. Four of these states result in no net signal inversion. That is, to produce a non-inverted signal at the output of the circuit path, either none of the switches are operated, or two of the three switches are operated to invert the signal, as shown in Table 1 below. Two of these non-inverted settings, namely [011] and [110], result in at least partial cancellation of the RFS in the circuit path as described herein. If an odd number of multiplexers ((i_pol[0]) 15. (i_pol[1]) 16, and (i_pol[2]) 17 are operated at the same time, the resulting output signal on the circuit will be inverted. Thus, four states, which are not shown in Table 1 below, invert the signal overall and would therefore not be used in some implementations.

TABLE 1

| i_pol[0] | i_pol[1] | i_pol[2] | R/F Skew |
|---|---|---|---|
| 0 | 0 | 0 | + RF0 + RF1 |
| 1 | 0 | 1 | − RF0 − RF1 |
| 0 | 1 | 1 | + RF0 − RF1 |
| 1 | 1 | 0 | − RF0 + RF1 |

Even though all switches may not be used, there may be some benefits to including an extra switch at either the front 24 or back 25 of a circuit path, such as circuit path 10. For example, in some examples, it may be more important to preserve a minimum positive pulse width in the circuit path than a negative pulse width, e.g., in a case where the path input has a sequence of narrow positive pulses separated by larger negative pulses. In this case, it may be desirable to tune the circuit path to obtain a somewhat positive RFS overall, e.g., to stretch the incoming positive pulses deliberately (and to reduce the negative pulses). This may be done by controlling which signals are inverted and, therefore, which circuits apply positive or negative RFS.

In some implementations, in a circuit path, there may be one or more circuits that are not surrounded by polarity switches, e.g., that outside the path shown in FIG. 2. This part of the circuit path may have an RFS that may be positive or negative. In this regard, a positive or negative RFS for a circuit path under consideration may make a difference in determining the overall RFS. Accordingly, with extra switches, there is an option to select a better of two opposite-sign RFS results that result in a lower overall RFS (e.g., absolute value for the RFS) for the circuit path.

In some implementations, there may be value in being able to flip the signal polarity in the entire circuit path. For example, by comparing a rising edge delay through the entire path (line and polarity switches) for two settings, it may be possible to directly measure the RFS of the whole circuit path. Note that this remains true even after a number of non-default settings have been selected for the polarity switches. Once the final switch selections have been selected, it is possible to invert whatever the two outside settings were used to measure the resulting RFS of the entire line (apart from minor errors due to the switches themselves as explained above).

In some implementations, one or more of circuits 6 and 7 may be, or include, adjustable delay lines. An adjustable delay line is a circuit path that has a delay that can be controlled at least over a particular frequency range. To understand how the techniques and processes described herein work for adjustable delay lines, compare two simple delay cases for one adjustable delay line. In case one, both circuits 6 and 7 are set to maximum delay. In case two, circuit 6 is still at maximum delay, but circuit 7 has been dialed to a minimum delay setting. There is now a non-negligible probability that the RFS of circuit 7, RF1, may have flipped sign between case one and twp. As a result, the desired polarity switch settings for case one and case two may not coincide. This issue may be more complicated when more than two circuits are present, e.g., n (n>1) circuits, where each of then circuits is an adjustable delay line, and where there are n+1 polarity switches arranged along the circuit path, with each circuit being between two polarity switches, as is the case in the example of FIG. 2.

Since RFS tends to be statistically worse for circuit paths (e.g., delay lines) having longer delay settings, the control circuitry may be configured select the polarity switch settings that reduce the RFS for the circuit paths having the longest delay settings. In some cases, this may mean that, for certain shorter delay settings, there may be greater RFS. But, by controlling the polarity for longer delay lines only (e.g., for pairs of circuits having delays greater than a predefined threshold), the final expected RFS distributions may be improved. In some implementations, different methods may be used for reducing RFS in cases where adjustable delay lines are used. For example, it is possible to determine the overall line RFS for all possible line settings and polarity switch settings, and then decide on the polarity switch setting that results in the smallest maximum RFS across all line delay settings. The polarity switches may then be controlled to implement the smallest maximum RFS across all line delay settings.

In some implementations processes are employed to obtain settings for the polarity switches that provide a maximum overall reduction in RFS for a given circuit path. To implement these processes, a technique may be used to measure rising edge delay through the circuit path and to re-measure this, multiple times. An example technique that may be used is described in U.S. Pat. No. 9,147,620 titled "Edge Triggered Calibration", which is incorporated herein by reference. However, any appropriate method can be used to measure rising edge delay through lines of interest.

In an example process, for n (n>1) circuits and n+1 switches in a circuit path, the total number of switch states is $2^{n+1}$. Only half of these switch states preserve the overall signal polarity (no net inversion) as described above with respect to Table 1. As mentioned, the overall RFS for each of these switch configurations can be established by measuring the difference of a rising edge delay through the circuit path between a selected switch state and this state with the outer two switches reversed from whatever position they were in. This results in $2^n$ RFS numbers. The switch setting having the lowest overall RFS may be selected, and those switches configured accordingly.

In some implementations (e.g., where n>3 above), a linear approach may be applied to simply flip a pair of switch polarity settings around each circuit in a circuit path to determine its RFS. This produces n measurements, resulting in n numbers. Then, the $2^n$ possible combinations that give the smallest absolute value for RF0+RF1+ . . . +RFn may be determined mathematically. The switch setting having the lowest overall RFS may be selected, and those switches configured accordingly.

In some implementations, information about skew (e.g., the amount and polarity of skew) produced by circuits in a circuit path may be stored in computer memory. That information may be retrieved to configure switches in the circuit path to achieve a desired amount of skew, e.g., a minimum skew, a positive skew, a negative skew, etc.

In some implementations, the techniques and processes described herein may be used in the context of timing generator analog circuitry that includes delay lines (e.g., circuit paths). Modern CMOS (complementary metal-oxide-semiconductor) fabrication processes may lead to device-mismatch-induced unintended pulse width variation that may be corrected using the techniques and processes described herein. In an example, the techniques and processes described herein may be used with a timing generator to perform RFS deskewing on long source synchronous signal paths related delay lines for both data (DQ) and strobe (DQS) signals.

In some implementations, the techniques and processes described herein constitutes a coarse RFS reduction process. For example, the techniques and processes may be implemented to reduce RFS to, e.g., 5 picoseconds (ps) in some implementations. The techniques and processes may be combined with those described in U.S. patent application Ser. No. 15/683,906 entitled "Adjusting Signal Timing" filed concurrently herewith and incorporated herein by reference, which may provide finer skew reduction, e.g., to , e.g., 1 ps or 2 ps in some implementations.

Figure 3:
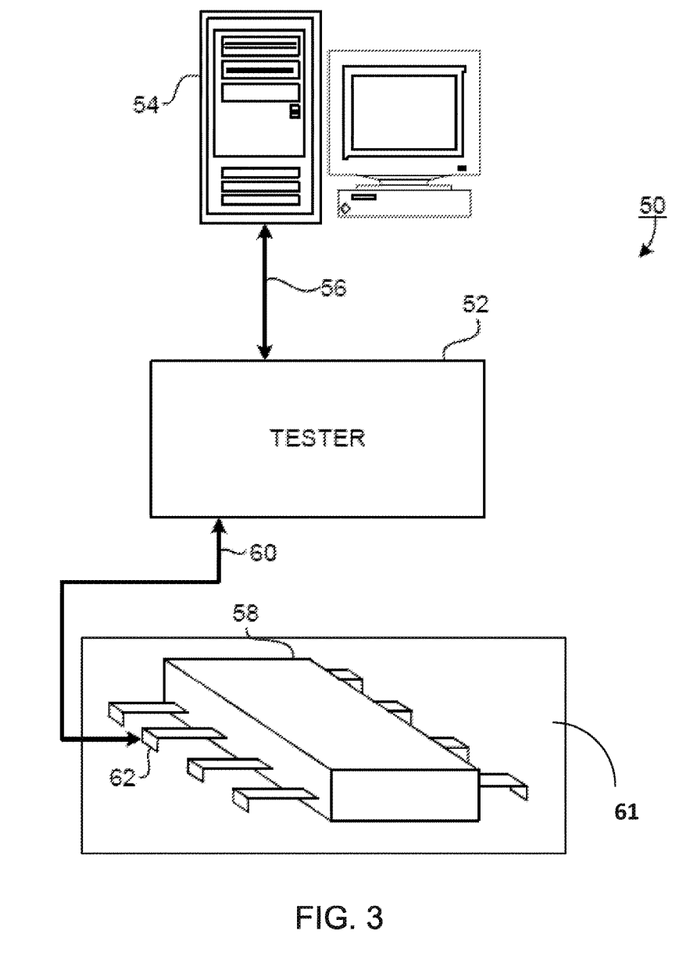
FIG. 3 is a block diagram of automatic test equipment (ATE) that may include circuit paths that are controllable to reduce RFS.

FIG. 3 shows a general ATE configuration in which techniques and processes described herein may be implemented. It is, however, emphasized that the techniques and processes described herein are not limited to any particular ATE configuration, including that of FIG. 3, and that the techniques and processes may be used in any appropriate context, including outside of the testing content.

Referring to FIG. 3, an example ATE system 50 for testing a DUT 58, such as those described herein, includes a tester (or "test instrument") 52. DUT 58 may be interfaced to a DIB 60. Tester 52 may include a number of channels, each of which may be a circuit path having an RFS that is controllable using the techniques and processes described herein. To control tester 52, system 50 includes a computer system 54 that interfaces with tester 52 over a hardwire connection 56. In some implementations, the computer system may control the polarity switches described herein to implement RFS reduction on one or more of the channels, as appropriate.

In an example operation, computer system 54 sends commands to tester 52 to initiate execution of routines and functions for testing DUT 58. Such executing test routines may initiate the generation and transmission of test signals to the DUT 58 and collect responses from the DUT. Various types of DUTs may be tested by system 50. In some implementations, the DUT may be any appropriate semiconductor or other device, such as an integrated circuit (IC) chip (e.g., memory chip, microprocessor, analog-to-digital converter, digital-to-analog converter, etc.) or other devices.

To provide test signals and collect responses from the DUT, tester 52 is connected to an interface to the internal circuitry of DUT 58. For example, the DUT may be inserted into a socket of DIB 61, which contains interfaces to electrical connections between the DUT and the tester. A conductor 60 (e.g., one or more conductive pathways) is connected to the interface and is used to deliver test signals (e.g., switching or DC test signals, etc.) to the internal circuitry of DUT 58. Conductor 60 also senses signals in response to the test signals provided by tester 52. For example, a voltage signal or a current signal may be sensed at pin 62 in response to a test signal and sent over conductor 60 to tester 52 for analysis. Such single port tests may also be performed on other pins included in DUT 58. For example, tester 52 may provide test signals to other pins and collect associated signals reflected back over conductors (that deliver the provided signals). By collecting the reflected signals, the input impedance of the pins may be characterized along with other single port testing quantities. In other test scenarios, a digital signal may be sent over conductor 60 to pin 62 for storing a digital value on DUT 58. Once stored, DUT 58 may be accessed to retrieve and send the stored digital value over conductor 60 to tester 52. The retrieved digital value may then be identified to determine if the proper value was stored on DUT 58.

Along with performing single port measurements, a two-port or multi-port test may also be performed by tester 52. For example, a voltage signal may be injected over conductor 60 into pin 62 in a force voltage mode, and a response signal may be collected from one or more other pins of DUT 58. This response signal may be provided to tester 52 to determine quantities, such as gain response, phase response, and other throughput measurement quantities. Other tests may also be performed. Tester 52 may source current to the DUT during force voltage mode, as described herein, based on the testing required.

The techniques and processes described herein may be implemented by, and/or controlled using, hardware or a combination of hardware and software. For example, a system like the ones described herein may include various controllers and/or processing devices located at various points in the system to control operation of the automated elements. A central computer may coordinate operation among the various controllers or processing devices. The central computer, controllers, and processing devices may execute various software routines to effect control and coordination of the various automated elements.

The techniques and processes described herein can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" as used herein may imply a direct physical connection or a wired or wireless connection that includes or does not include intervening components but that nevertheless allows electrical signals to flow between connected components. Any "connection" involving electrical circuitry mentioned herein, unless stated otherwise, is an electrical connection and not necessarily a direct physical connection regardless of whether the word "electrical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method performed for a circuit path, the method comprising:
   determining information about skew produced by circuits electrically connected in series in the circuit path, the information comprising the skew produced by the circuits for different configurations of each of multiple polarity switch circuits in the circuit path;
   receiving signals in the circuit path, the circuit path being from a test circuit to a device interface board holding a device under test; and
   controlling states of the signals in the circuit path, the states being controlled by controlling the multiple polarity switch circuits based on the information, the multiple polarity switch circuits being controllable to invert at least two of the signals in the circuit path so that skews produced by different circuits connected in series in the circuit path at least partially cancel, where there is no net inversion of the signals caused by the circuit path;
   wherein each of the multiple polarity switch circuits comprises a multiplexer combined with corresponding inverter circuitry, wherein each of the multiplexers combined with corresponding inverter circuitry is connected in a same series circuit with at least one other of the multiplexers combined with corresponding inverter circuitry, and wherein a control circuit analyzes the skew for the circuit path and adjusts one or more polarity switch settings of the switch circuits to reduce the skew in the circuit path.

2. The method of claim 1, wherein one or more of the circuits electrically connected in series in the circuit path has an adjustable delay; and
   wherein controlling the states of the signals comprises controlling one or more of the multiplexers combined with corresponding inverter circuitry based on a setting of the adjustable delay.

3. The method of claim 1, wherein the multiple polarity switch circuits comprise:
   a first multiplexer combined with corresponding inverter circuitry to control a state of a first signal; and
   a second multiplexer combined with corresponding inverter circuitry to control a state of a second signal, the first multiplexer combined with corresponding inverter circuitry and the second multiplexer combined with corresponding inverter circuitry being electrically connected in series in the circuit path;
   wherein controlling the states of the signals comprises:
   causing the first multiplexer combined with corresponding inverter circuitry to invert the first signal and not to invert the second signal; or
   causing the second multiplexer combined with corresponding inverter circuitry to not invert the first signal and to invert the second signal.

4. The method of claim 3, wherein the first signal and the second signal comprise components of a signal passing through the circuit path;
   wherein inverting the first signal and not inverting the second signal reduces skew in the signal passing through the circuit path; or
   wherein not inverting the first signal and inverting the second signal reduces skew in the signal passing through the circuit path.

5. The method of claim 3, wherein controlling the multiple polarity switch circuits comprises:
   controlling one or more inputs to the multiple polarity switch circuits in order to perform one of:
   causing the first polarity switch circuit to invert the first signal and not to invert the second signal; or
   causing the second polarity switch circuit not to invert the first signal and to invert the second signal.

6. The method of claim 1, further comprising:
   inverting at least one other of the signals by switching wire paths of differential signals used in the circuit path.

7. The method of claim 1, wherein the circuit path is part of automatic test equipment, the circuit path being between pin electronics of the automatic test equipment and a device interface board to which a device under test connects.

8. The method of claim 1, wherein the states are controlled independently.

9. Circuitry comprising:
   a first circuit to skew a first signal in a first direction or a second direction;
   a second circuit to skew a second signal in the first direction or the second direction, the first circuit and the second circuit being electrically connected in series in a circuit path, the circuit path being from a test circuit to a device interface board holding a device under test;
   multiple polarity switch circuits to control skew in the circuit path by controlling at least one of a state of the first signal or a state of the second signal, the multiple polarity switch circuits being electrically connected in series in the circuit path with the first circuit and the second circuit;
   a controller to determine first information about first skew produced by the first circuit and second information about second skew produced by the second circuit, the information about the first skew and the second skew being for different configurations of each of the multiple polarity switch circuits in the circuit path;

wherein the controller is configured to use at least one of the first information or the second information to control one or more of the multiple polarity switch circuits to control the state of at least one of the first signal or the state of the second signal in order to reduce skew between the first circuit and the second circuit connected in series, wherein there is no net signal inversion caused by the circuit path; and wherein each of the multiple polarity switch circuits comprises a multiplexer combined with corresponding inverter circuitry, wherein each of the multiplexers combined with corresponding inverter circuitry is connected in a same series circuit with at least one other of the multiplexers combined with corresponding inverter circuitry, and wherein a control circuit analyzes the skew for the circuit path and adjusts one or more polarity switch settings of the switch circuits to reduce the skew in the circuit path.

10. The circuitry of claim 9, wherein reducing the skew comprises reducing an amount of the skew in the circuit path to a non-zero value.

11. The circuitry of claim 10, further comprising additional circuitry to reduce an amount of the skew from the non-zero value.

12. The circuitry of claim 9, wherein the multiple polarity switch circuits comprise:
   a first multiplexer combined with corresponding inverter circuitry that precedes, and is electrically connected in the circuit path to, the first circuit, the first multiplexer combined with corresponding inverter circuitry to produce the state of the first signal;
   a second multiplexer combined with corresponding inverter circuitry that is between, and electrically connected in the circuit path to both of, the first circuit and the second circuit, the second multiplexer combined with corresponding inverter circuitry to produce the state of the second signal; and
   a third multiplexer combined with corresponding inverter circuitry that follows, and is electrically connected in the circuit path to, the second circuit, the third multiplexer combined with corresponding inverter circuitry to produce a state following an output of the second circuit.

13. The circuitry of claim 12, wherein the first multiplexer combined with corresponding inverter circuitry is controllable either to invert the first signal or not to invert the first signal, the state of the first signal being inverted or not inverted;
   wherein the second multiplexer combined with corresponding inverter circuitry is controllable either to invert the second signal or not to invert the second signal, the state of the second signal being inverted or not inverted; and
   wherein the third multiplexer combined with corresponding inverter circuitry is controllable either to invert the state following the output of the second circuit or not to invert the output, the state following the output being inverted or not inverted.

14. The circuitry of claim 12, wherein the first multiplexer combined with corresponding inverter circuitry comprises a multiplexer combined with an inverter at an input thereof, the second multiplexer combined with corresponding inverter circuitry comprises a multiplexer combined with an inverter at an input thereof, and the third multiplexer combined with corresponding inverter circuitry comprises a multiplexer combined with an inverter at an input thereof.

15. The circuitry of claim 13, wherein the controller is configured to control two, but not all, of: one or more of the multiple polarity switch circuits to control the state of the first signal, the state of the second signal, or the state following the output.

16. The circuitry of claim 9, wherein a total cumulative skew produced in the circuit path includes a sum of first skew produced by the first circuit and second skew produced by the second circuit; and
   wherein the controller is configured to control one or more of the multiple polarity switch circuits to control one or more of the state of the first signal or the state of the second in order to reduce the total cumulative skew.

17. The circuitry of claim 9, wherein the first circuit or the second circuit comprises an adjustable delay line; and
   wherein the control circuitry is configured to control skew in the circuit path based also on stored information about delay associated with the adjustable delay line.

18. The circuitry of claim 9, wherein the controller is configured to control one or more of the multiple polarity switch circuits to control skew in the circuit path by inverting or not inverting the first signal so as to affect, as least partly, skew caused by the first circuit; or
   wherein the controller is configured to control one or more of the multiple polarity switch circuits to control skew in the circuit path by inverting or not inverting the second signal so as to affect, as least partly, skew caused by the second circuit.

19. Automatic test equipment comprising:
   the circuitry of claim 9; and
   the device interface board, the circuit path for passing signals to, and from, the device interface board.

20. The circuitry of claim 9, further comprising circuitry to produce a finer reduction in skew than through control over one or more of: the state of the first signal or the state of the second signal.

* * * * *